US008669315B2

(12) United States Patent
Gallucci et al.

(10) Patent No.: US 8,669,315 B2
(45) Date of Patent: Mar. 11, 2014

(54) POLYCARBONATE COMPOSITIONS AND METHODS FOR THE MANUFACTURE AND USE THEREOF

(75) Inventors: Robert R. Gallucci, Mt. Vernon, IN (US); James A. Mahood, Evansville, IN (US); Jean Francois Morizur, Evansville, IN (US); Steve Dimond, Bedford, NH (US)

(73) Assignee: SABIC Innovative Plastics IP B.V., X Bergen op Zoom (NL)

( * ) Notice: Subject to any disclaimer, the term of this patent is extended or adjusted under 35 U.S.C. 154(b) by 0 days.

(21) Appl. No.: 13/564,359

(22) Filed: Aug. 1, 2012

(65) Prior Publication Data

US 2013/0053487 A1 Feb. 28, 2013

Related U.S. Application Data

(60) Provisional application No. 61/526,034, filed on Aug. 22, 2011.

(51) Int. Cl.
*C08K 5/526* (2006.01)

(52) U.S. Cl.
USPC ............................ 524/427; 524/151; 524/153

(58) Field of Classification Search
USPC .......................................... 524/147, 151, 153
See application file for complete search history.

(56) References Cited

U.S. PATENT DOCUMENTS 4,831,105 A 5/1989 Schissel
4,920,200 A 4/1990 Brunelle et al.
4,950,731 A 8/1990 Faler et al.
6,469,127 B1 10/2002 Furunaga et al.
7,528,214 B2 5/2009 Chatterjee et al.
2003/0149223 A1 8/2003 McCloskey et al.
2005/0192424 A1 9/2005 Shafer et al.
2007/0197700 A1* 8/2007 Gallucci et al. ............... 524/210
2007/0208112 A1* 9/2007 Schambony et al. ........... 524/99
2009/0326107 A1 12/2009 Bittner
2011/0128494 A1* 6/2011 Takahashi et al. ............ 351/159
2011/0168657 A1 7/2011 Bittner
2011/0195222 A1* 8/2011 Nakagawa et al. ........... 428/131
2012/0123083 A1* 5/2012 Nunome et al. .............. 528/176

FOREIGN PATENT DOCUMENTS

EP 2316877 A2 5/2011
JP 2001019741 A 1/2001
JP 2003176348 A 6/2003
JP 2004010874 A 1/2004
JP 2009114417 A 5/2009
WO WO-2008/051849 A1 5/2008

OTHER PUBLICATIONS

International Search Report and Written Opinion issued on Dec. 6, 2012 for International Patent Application No. PCT/US2012/051563, filed Aug. 20, 2012 [Applicant—Sabic Innovative Plastics IP B.V. // pp. 1-11].

* cited by examiner

*Primary Examiner* — Peter Szekely
(74) *Attorney, Agent, or Firm* — Ballard Spahr, LLP

(57) ABSTRACT

This disclosure relates generally to polycarbonate compositions whose hydrolysis products and residual monomer content, if any, exhibit little or no estradiol binding activity. Also disclosed are methods for making the disclosed polycarbonates and articles of manufacture comprising the disclosed polycarbonates.

37 Claims, No Drawings

POLYCARBONATE COMPOSITIONS AND METHODS FOR THE MANUFACTURE AND USE THEREOF

CROSS REFERENCE TO RELATED APPLICATIONS

This application claims the benefit of priority to U.S. Provisional Application No. 61/526,034, filed Aug. 22, 2011, which is hereby incorporated by reference in its entirety.

FIELD OF THE INVENTION

The present disclosure relates to polycarbonate compositions having, among other characteristics, significantly reduced or even no measurable level of estradiol like binding activity. Also included herein are methods for preparing and/or using the same, as well as articles formed from such compositions and blends

BACKGROUND OF THE INVENTION

Polycarbonates (PC) are synthetic thermoplastic resins derived from bisphenols and phosgenes, or their derivatives. They are linear polyesters of carbonic acid and can be formed from dihydroxy compounds and phosgene or carbonate diesters, or by ester interchange. Polymerization may be in melt, aqueous, interfacial, or in nonaqueous solution. Polycarbonates are a useful class of polymers having many desired properties. They are highly regarded for optical clarity and enhanced impact strength and ductility at room temperature or below.

It is known however that polymerization reactions, including those used to manufacture polycarbonates, may not proceed to completion in all instances thus leading to the presence of unreacted residual monomer in the polymeric material. Besides affecting polymer properties, the presence of residual monomers may also be of concern in terms of emerging regulatory compliance. Therefore, complete conversion of monomers is usually the desire of any polymer producer but is not always attainable. Additionally, when subjected to certain conditions, polycarbonates can undergo degradation reactions, such as hydrolytic or thermolytic degradation, resulting in the formation of hydrolysis and/or thermolysis degradants or reaction products. The resulting degradants commonly correspond chemically to the monomeric starting materials initially used to manufacture the polycarbonate and may also be of concern.

To that end, there remains a need in the art for thermoplastic polycarbonate compositions whose residual monomer content, if any, and whose hydrolytic degradation products exhibit certain beneficial characteristics. Desirable characteristics of such residual monomer or degradants include, among others, relatively little or even no estradiol binding activity.

SUMMARY OF THE INVENTION

This invention relates generally to polycarbonate compositions whose hydrolytic degradation products exhibit relatively little or even no estradiol binding activity. The polycarbonate compositions are manufactured from starting materials that similarly have relatively little or even no estradiol binding activity.

In view of the foregoing, in a first aspect, the invention generally provides a polycarbonate composition comprising repeating carbonate units derived from one or more aromatic dihydroxy monomer, wherein each of the one or more aromatic dihydroxy monomers does not exhibit a half maximal inhibitory concentration ($IC_{50}$) less than 0.00025M for alpha or beta in vitro estradiol receptors. Thus, when the polycarbonate is subjected to conditions effective to provide one or more degradation products, such as a hydrolysis or thermolysis product, each of the one or more degradation products does not displace estradiol even at a concentrations as high as 0.00025M. In other instances, when the polycarbonate is subjected to conditions effective to provide one or more degradation products, each of the one or more degradation products also does not exhibit a half maximal inhibitory concentration ($IC_{50}$) equal to or greater than 0.00025M for alpha or beta in vitro estradiol receptors.

The present invention also provides polymer blends comprising the polycarbonate compositions disclosed herein as well as various articles of manufacture comprising the polycarbonate compositions disclosed herein.

In still a further aspect, the invention provides a method for the manufacture of the disclosed polycarbonate compositions. The method generally comprises reacting an aromatic dihydroxy monomer and carbonyl source reactant under conditions effective to provide a polycondensation reaction product comprising a polycarbonate. The aromatic dihydroxy monomer is selected such that does not exhibit a half maximal inhibitory concentration ($IC_{50}$) less than 0.00025M for alpha or beta in vitro estradiol receptors. The resulting polycarbonate is further characterized in that when the polycarbonate is subjected to conditions effective to provide one or more hydrolysis product, each of the one or more hydrolysis products does not exhibit a half maximal inhibitory concentration ($IC_{50}$) less than 0.00025M for alpha or beta in vitro estradiol receptors.

Additional advantages will be set forth in part in the description which follows. The advantages will be realized and attained by means of the elements and combinations particularly pointed out in the appended claims. It is to be understood that both the foregoing general description and the following detailed description are exemplary and explanatory only and are not restrictive, as claimed.

DETAILED DESCRIPTION OF THE INVENTION

The present invention can be understood more readily by reference to the following detailed description, examples, drawings, and claims, and their previous and following description. However, before the present compositions, compounds, devices, systems, and/or methods are disclosed and described, it is to be understood that this invention is not limited to the specific compositions, compounds, devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those of ordinary skill in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to an "aromatic dihydroxy monomer" can include two or more such monomers unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular approximated value forms another aspect of the invention. It will be further understood that the endpoints of each of the ranges are significant both in relation to the other endpoint, and independently of the other endpoint.

All ranges disclosed herein are inclusive of the endpoints and are independently combinable. The endpoints of the ranges and any values disclosed herein are not limited to the precise range or value; they are sufficiently imprecise to include values approximating these ranges and/or values. Ranges articulated within this disclosure, e.g. numerics/values, shall include disclosure for possession purposes and claim purposes of the individual points within the range, sub-ranges, and combinations thereof. As an example, for the recitation of numeric ranges herein, each intervening number there between with the same degree of precision is explicitly contemplated—for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Various combinations of elements of this disclosure are encompassed by this invention, e.g. combinations of elements from dependent claims that depend upon the same independent claim.

As used herein, the terms "optional" or "optionally" mean that the subsequently described event, condition, component, or circumstance may or may not occur, and that the description includes instances where said event or circumstance occurs and instances where it does not.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— units in the polyester, regardless of whether ethylene glycol was used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen or may be composed exclusively of carbon and hydrogen ("Alkyl"). Aliphatic groups may be substituted or unsubstituted. Exemplary aliphatic groups include, but are not limited to, methyl, ethyl, isopropyl, isobutyl, chloromethyl, hydroxymethyl (—$CH_2OH$), mercaptomethyl (—$CH_2SH$), methoxy, methoxycarbonyl ($CH_3OCO$—), nitromethyl (—$CH_2NO_2$), and thiocarbonyl.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C═C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-$CCl_3$Ph-).

The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C═O.

The term "integer" means a whole number and includes zero. For example, the expression "n is an integer from 0 to 4" means n may be any whole number from 0 to 4, including 0.

As used herein, a carbonyl source reactant refers to a carbonyl containing compound capable of reacting with an aromatic dihydroxy monomer to provide a carbonate. According to some embodiments, a carbonyl source reactant can include a carbonyl halide, such as for example phosgene. According to other embodiments, the carbonyl reactant source can include a carbonic acid diester. Exemplary carbon acid diesters include diaryl carbonates, such as diphenyl carbonate (DPC) or activated diaryl carbonates, such as bismethylsalicylcarbonate (BMSC).

As used herein, the term half maximal inhibitory concentration ($IC_{50}$) is a quantitative measure that indicates how much of a particular substance, i.e., an inhibitor, is needed to inhibit a given biological process or component of a process, by one half. In other words, it is the half maximal (50%) inhibitory concentration (IC) of a substance (50% IC, or $IC_{50}$). It is commonly known to one of ordinary skill in the art and used as a measure of antagonist drug potency in pharmacological research. The ($IC_{50}$) of a particular substance can be determined using conventional competition binding assays. In this type of assay, a single concentration of radioligand (such as an agonist) is used in every assay tube. The ligand is used at a low concentration, usually at or below its $K_d$ value. The level of specific binding of the radioligand is then determined in the presence of a range of concentrations of other competing non-radioactive compounds (usually antagonists), in order to measure the potency with which they compete for the binding of the radioligand. Competition curves may also be computer-fitted to a logistic function as described under direct fit. The $IC_{50}$ is the concentration of competing ligand which displaces 50% of the specific binding of the radioligand.

As summarized above, the present invention provides polycarbonate compositions that, when subjected to conditions effective to result in degradation, such as for example conditions effective for thermolysis or hydrolysis of the polycarbonate, do not produce degradants exhibiting significant estradiol like binding activity. As described in more detail below, the lack of significant estradiol like binding activity of these degradation products can be characterized by a determination of their half maximal inhibitory concentration ($IC_{50}$) for alpha or beta in vitro estradiol receptors. For example, degradation products derived from polycarbonates of the invention do not exhibit a half maximal inhibitory concentration ($IC_{50}$) less than 0.00025M for alpha or beta in vitro estradiol receptors. According to further embodiments, degradation products derived from polycarbonates of the invention do not exhibit a half maximal inhibitory concentration ($IC_{50}$) less than 0.0003M, 0.00035M, 0.0004M, 0.00045M, 0.0005M, 0.00075M, or even 0.001M, for alpha or beta in vitro estradiol receptors. In still other embodiments, degradation products derived from polycarbonates of the invention do not exhibit any identifiable half maximal inhibitory concentration ($IC_{50}$) greater than or equal to about 0.00025M, 0.0003M, 0.00035M, 0.0004M, 0.00045M, 0.0005M, 0.00075M, or even 0.001M, for alpha and/or beta in vitro estradiol receptors.

Polycarbonates are conventionally manufactured through a transesterification reaction of one or more aromatic dihydroxy monomer(s) and a carbonyl reactant source in the presence of one or more polymerization catalyst(s). This polymerization reaction can be performed as either a batch wise interfacial process or a continuous melt process. The resulting polycarbonate thus comprises repeating carbonate units derived from the one or more aromatic dihydroxy monomer(s) and the carbonyl reactant source.

The polycarbonates of the present invention can be prepared using any conventionally known polymerization reaction suitable for forming a polycarbonate, however, the polycarbonates of the invention comprise repeating carbonate units derived from one or more aromatic dihydroxy monomer obtained from a select group wherein each of the one or more aromatic dihydroxy monomers does not exhibit a half maximal inhibitory concentration ($IC_{50}$) less than 0.00025M for alpha or beta in vitro estradiol receptors. According to further embodiments, each of the one or more aromatic dihydroxy monomers do not exhibit a half maximal inhibitory concentration ($IC_{50}$) less than 0.0003M, 0.00035M, 0.0004M, 0.00045M, 0.0005M, 0.00075M, or even 0.001M, for alpha or beta in vitro estradiol receptors. In still other embodiments, aromatic dihydroxy monomers do not exhibit any identifiable half maximal inhibitory concentration ($IC_{50}$) greater than or equal to about 0.00025M, 0.0003M, 0.00035M, 0.0004M, 0.00045M, 0.0005M, 0.00075M, or even 0.001M, for alpha and/or beta in vitro estradiol receptors.

According to some embodiments of the invention, suitable aromatic dihydroxy monomers comprise phenolic monomers. These phenolic monomers can comprise dihydric phenols, mono phenols, bisphenols, or a combination thereof. Specific examples of suitable aromatic dihydroxy monomers include, without limitation, resorcinol, hydroquinone, methyl hydroquinone, t-butyl hydroquinone, di-t-butyl hydroquinones (DTBHQ), biphenols, tetramethyl bisphenol-A, spiro biindane bisphenols (SBIBP), bis-(hydroxy aryl)-N-aryl isoindolinones, or any combination thereof. In other embodiments, hydroxy benzoic acids can be used. It should be understood that, in view of this disclosure, any additional suitable aromatic dihydroxy monomers exhibiting a lack of estradiol binding activity characterized by the half maximal inhibitory concentration values described above may be used.

As defined above, the term polycarbonate refers to polymeric compounds comprising repeating carbonate units derived from one or more aromatic dihydroxy monomers. It should be understood, however, that polycarbonates of the invention are not limited to polymers only containing carbonate units. For example, "polycarbonates" and "polycarbonate polymers" as used herein further includes blends of polycarbonates with other copolymers comprising carbonate chain units. An exemplary copolymer is a polyester carbonate, also known as a copolyester-polycarbonate and comprising repeating carbonate units as described above and repeating ester units derived from one or more dicarboxylic acid monomers. Suitable dicarboxylic acid monomers include those that similarly do not exhibit a half maximal inhibitory concentration ($IC_{50}$) less than 0.00025M for alpha or beta in vitro estradiol receptors. According to further embodiments, the disclosed dicarboxylic acid monomers do not exhibit a half maximal inhibitory concentration ($IC_{50}$) less than 0.0003M, 0.00035M, 0.0004M, 0.00045M, 0.0005M, 0.00075M, or even 0.001M, for alpha or beta in vitro estradiol receptors. In still other embodiments, the disclosed dicarboxylic acid monomers do not exhibit any identifiable half maximal inhibitory concentration ($IC_{50}$) greater than or equal to about 0.00025M, 0.0003M, 0.00035M, 0.0004M, 0.00045M, 0.0005M, 0.00075M, or even 0.001M, for alpha and/or beta in vitro estradiol receptors.

According to embodiments of the invention, suitable dicarboxylic acid monomers include isophthalic acid, terephthalic acid, $C_6$ to $C_{36}$ aliphatic dicarboxylic acids, or any combination thereof. Suitable phenolic carboxylic acids include hydroxy benzoic acid. It should also be understood that, in view of this disclosure, any additional suitable dicarboxylic acid monomers exhibiting a lack of estradiol binding activity characterized by the half maximal inhibitory concentration values described above may be used.

The polycarbonates of the present invention can be provided as homopolymers comprising repeat carbonate units derived from a single aromatic dihydroxy monomer. Alternatively, in other embodiments, the polycarbonates of the instant invention can be co-polycarbonates. As will be understood, such co-polycarbonates will comprise repeating carbonate units derived from two or more aromatic dihydroxy monomers as described herein. In still further embodiments, the polycarbonates of the instant invention can be co-poly (ester carbonates). As will be understood, such co-poly(ester carbonates) can comprise repeating ester units derived from two or more dicarboxylic acid monomers as described herein.

Conventional polymerization processes for manufacturing polycarbonates commonly employ the use of a chain stopper (also referred to as an endcapping agent) during the polymerization reaction. The chain stopper limits molecular weight growth rate, and thus can be used to control molecular weight in the polycarbonate. To that end, many conventionally known end capping agents exhibit undesirably high levels of estradiol binding activity. In contrast, however, suitable end capping agents or chain stoppers for use with the present invention exhibit estradiol binding activity levels similar or even identical to that of the selected aromatic dihydroxy monomers. More specifically, the end capping agents suitable for use in the present invention also do not exhibit a half maximal inhibitory concentration ($IC_{50}$) less than 0.00025M for alpha or beta in vitro estradiol receptors. As such, a degradation product of the selected chain stopper will likewise not exhibit a half maximal inhibitory concentration ($IC_{50}$) less than 0.00025M for alpha or beta in vitro estradiol receptors. Exemplary chain stoppers include certain mono-phenolic compounds, phenyl chloroformate and the like. In a preferred embodiment, a suitable chain stopper for use in the present invention is phenol or phenyl chloroformate. Thus, when phenol is included as a chain stopper, the resulting polycarbonate comprises phenol as an end cap to the polymer chain. It should be understood however that the polycarbonates disclosed herein can be produced having any desired molecular weight (Mw) with any end cap providing the end cap has a half maximal inhibitory concentration ($IC_{50}$) less than 0.00025M for alpha or beta in vitro estradiol receptors.

According to some embodiments, disclosed polycarbonates can have molecular weights in the range of from 3,000 to 80,000 Daltons. The disclosed polycarbonate and co-polycarbonate compositions can have any desired molecular weight. For example, disclosed polycarbonates can have weight average molecular weights in the range of from 3,000 to 80,000 Daltons, including exemplary molecular weights of 5,000, 7,000, 10,000, 15,000, 20,000, 25,000, 30,000, 35,000, 40,000 and 45,000, 50,000, 55,000, 60,000, 65,000, 70,000 and 75,000. In still further examples, the molecular weight of a disclosed polycarbonate can be in a range of from any one of the above mentioned values to any other of the above mentioned values. For example, molecular weight of a disclosed polycarbonate can be in the range of from 3,000 to 80,000 Daltons using polycarbonate standards. In still a further example, the molecular weight of a disclosed polycarbonate can be expressed as a value less than any one of the above disclosed values or, alternatively, can be expressed as a value greater than any one of the above disclosed values. For example, the molecular weight of a disclosed polycarbonate can be greater than 3,000 Daltons, or less than 80,000 Daltons. Molecular weight may be determined by gel permeation chromatography (GPC) as described in American Society for Testing Materials (ASTM) method D5296. In addition to the repeating structural units described above, it is further contemplated that the polycarbonates of the present invention can comprise one or more non-polycarbonate additives. Preferably, the one or more non-polycarbonate additive also does not exhibit a half maximal inhibitory concentration ($IC_{50}$) less than 0.00025M for alpha or beta in vitro estradiol receptors. To that end, exemplary and non-limiting additives that can be incorporated into the polycarbonates include stabilizers, antioxidants, colorants, impact modifiers, flame retardants, branching agents, anti drip additives, mold release additives, lubricants, plasticizers, minerals, reinforcement additives such as carbon or glass fibers, or any combination thereof.

Any one or more of the above referenced non-polycarbonate additives can be provided as a phosphorous containing compound. Exemplary phosphorous containing compounds including phosphites, phosphonates, phosphates, or a combination thereof. Thus, according to embodiments of the invention where phosphorous containing additives are present, it is preferable that the particular phosphorous containing additive similarly does not exhibit a half maximal inhibitory concentration ($IC_{50}$) less than 0.00025M for alpha or beta in vitro estradiol receptors. To that end, when such phosphorous containing additives are subjected to a hydrolysis reaction under conditions effective to provide one or more hydrolysis products, the hydrolysis product will similarly not exhibit a half maximal inhibitory concentration ($IC_{50}$) less than 0.00025M for alpha or beta in vitro estradiol receptors.

According to embodiments of the invention, suitable phosphite additives include diphenyl alkyl phosphites, phenyl dialkyl phosphites, trialkyl phosphites, dialkyl phosphites, triphenyl phosphites, diphenyl pentaerythritol diphosphite, or any combination thereof. In various embodiments, a phosphite or phosphonate or mixture thereof the additive can be present in an amount of, for example, from about 0.00001 wt. % to about 0.3 wt %, or from about 0.0001 wt. % to about 0.01 wt %. In another embodiment, a phosphite additive can have a molecular weight (Mw) of greater than about 200 Daltons.

According to further embodiments of the invention the phosphorous compound can be a phosphate. Suitable phosphate additives include triphenyl phosphate, resorcinol phenyl diphosphate, spirobiindane phenyl diphosphate, di-tert-butyl hydroquinone phenyl diphosphate, biphenol phenyl diphosphate, hydroquinone phenyl diphosphate, or any combination thereof In various embodiments, the phosphates can be useful in flame retardant polycarbonate blends, such as, for example, PC-ABS, PC-MBS or PC-ABS-MBS blends. In one embodiment, an aryl phosphate can be used at, for example, 1 wt. % to 30 wt % of the composition. In other embodiments, from about 5 wt. % to about 20 wt % of an aryl phosphate can be present. In yet other embodiments, the aryl phosphate will have a molecular weight of from about 300 Daltons to about 1500 Daltons. It should also be understood that, in view of this disclosure, any additional suitable phosphorous containing additive, or hydrolysis product thereof, exhibiting a lack of estradiol binding activity characterized by the half maximal inhibitory concentration values described above can used.

The polycarbonates described herein can be manufactured by any conventionally known stepwise polycondensation (transesterification) process wherein one or more provided aromatic dihydroxy monomers, one or more optional dicarboxylic acid monomers, and a provided carbonyl source reactant are reacted under conditions effective to provide a polycondensation reaction product. Such processes include conventional interfacial polymerization processes and conventional melt polymerization processes. Similarly, the manufacture of the polycarbonates can be batch wise or continuous.

The conditions effective to provide the polycondensation reaction product typically comprise the presence of a polymerization catalyst. To that end, catalysts used in the transesterification polymerization production of polycarbonates are well-known in the art and include both primary or secondary catalysts. Secondary catalysts are typically volatile and degrade at elevated temperatures. Secondary catalysts are therefore preferred for use at early low-temperature polymerization stages or in interfacial polymerization. Primary catalysts are typically more thermally stable and less volatile than secondary catalysts and are often used in melt processes.

The primary catalyst suitable for use with the present invention will preferably comprise a source of alkali or alkaline earth ions. The source of these ions includes alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Alkaline earth metal hydroxides are illustrated by calcium hydroxide and magnesium hydroxide. Of these sodium hydroxide is often preferred. The primary catalyst typically will be used in an amount sufficient to provide between $1\times10^{-4}$ and $1\times10^{-8}$, preferably $1\times10^{-4}$ and $1\times10^{-7}$ moles of metal hydroxide per mole of the dihydroxy compounds employed.

Other sources of alkaline earth and alkali metal ions include salts of carboxylic acids, such as sodium acetate and derivatives of ethylene diamine tetra acetic acid (EDTA) such as EDTA tetrasodium salt, and EDTA magnesium disodium salt. In one embodiment of the present invention the primary catalyst comprises at least one alkali metal salt of a carboxylic acid, at least one alkaline earth metal salt of a carboxylic acid, or combinations thereof. In one embodiment of the present invention the primary catalyst comprises $Na_2$Mg EDTA or a salt thereof.

The primary transesterification catalyst may also comprise one or more salts of a non-volatile inorganic acid. In one embodiment of the present invention the primary catalyst comprises at least one salt of a non-volatile inorganic acid. Salts of non-volatile inorganic acids are illustrated by $NaH_2PO_3$, $NaH_2PO_4$, $Na_2HPO_3$, $KH_2PO_4$, $CsH_2PO_4$, and $Cs_2HPO_4$. The primary transesterification catalyst may comprise one or more mixed alkali metal salts of phosphoric acid. Examples of mixed alkali metal salts of phosphoric acid include $NaKHPO_4$, $CsNaHPO_4$, and $CsKHPO_4$.

Secondary catalysts that can be used in accordance with the present invention preferably comprise a quaternary ammonium compound, a quaternary phosphonium compound, or a mixture thereof. The quaternary ammonium compound is preferably selected from the group of organic ammonium compounds having structure,

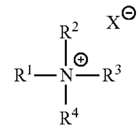

wherein $R^1$-$R^4$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate. Non-limiting examples of suitable organic quaternary ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is preferably selected from the group of organic phosphonium compounds having structure,

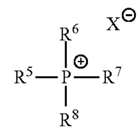

wherein $R^5$-$R^8$ are independently a $C^1$-$C^{20}$ alkyl radical, $C^4$-$C^{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic quaternary phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred. Where $X^-$ is a polyvalent anion such as carbonate or sulfate it is understood that the positive and negative charges in the quaternary ammonium and phosphonium structures are properly balanced. For example, where $R^1$-$R^4$ are each methyl groups and $X^-$ is carbonate, it is understood that $X^-$ represents 2 $(CO_3^{-2})$.

The amount of secondary catalyst employed is typically based upon the total number of moles of dihydroxy compound employed in the polymerization reaction. When referring to the ratio of secondary catalyst, for example phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts employed typically will be in a range between $1\times10^{-2}$ and $1\times10^{-5}$, preferably between $1\times10^{-3}$ and $1\times10^{-4}$ moles per mole of the dihydroxy compounds in the reaction mixture. Any primary or secondary catalyst, or mixture thereof, should be free of any monomer that could have estradiol binding at least less than or equal to 2.5×E−4M. In other instances any thermal or hydrolytic decomposition product from the primary or secondary catalyst, or mixture thereof, should also show no estradiol binding at least less than or equal to 2.5×E−4M.

In addition to the polymerization catalyst, a chain stopper (also referred to as an endcapping agent) can be included during polymerization. The chain stopper limits molecular weight growth rate, and thus controls molecular weight in the polycarbonate. Exemplary chain stoppers include certain mono-phenolic compounds, mono-carboxylic acid chlorides, and/or mono-chloroformates. Preferably, the chain stopper can be selected such that any hydrolysis product of the selected chain stopper will not exhibit a half maximal inhibitory concentration ($IC_{50}$) less than 0.00025M for alpha or beta in vitro estradiol receptors. For example, and without limitation, a suitable chain stopper for use in the present invention is phenol or phenyl mono chloroformate. Thus, when phenol is included as a chain stopper, the resulting polycarbonate comprises phenol as an end cap to the polymer chain. To this end, it should be understood that the polycarbonates disclosed herein can be produced having any desired molecular weight (Mw). However, in a preferred embodiment, the polycarbonates of the invention have molecular weights in the range of from 3,000 to 80,000 Daltons.

As noted above, in addition to homopolymers, the polycarbonates of the invention can include co-polycarbonates comprising repeating carbonate units derived from two or more aromatic dihydroxy monomers. According to these embodiments, it should be understood that the polycarbonates can be formulated to provide any desired relative mole ratio of repeating carbonate units within the chain of co-polycarbonates. Similarly, according to those embodiments where the polycarbonate is a poly(ester carbonate), comprising repeating units derived from at least on aromatic dihydroxy monomer and repeating ester unit derived from at least one dicarboxylic acid monomer, the poly(ester carbonate) can be formulated to provide any desired mole ratio of repeating carbonate units relative to repeating ester unites within the poly(ester carbonate) chain. Still further, in those embodiments where the polycarbonate is a co-(polyester carbonate) comprising repeating ester units derived from two or more dicarboxylic acid monomers, the polycarbonates can be formulated to provide any desired relative mole ratio of repeating ester units within the co-polyester carbonate chain.

The relative mole ratio among the various monomeric components present in a copolymer will depend, in part, upon the total number of differing monomeric components present. The mole ratios can be expressed as relative mole percentages whereby the total mole percentage of monomeric components adds up to 100 mole %. For example, a copolymer comprising a blend of a first aromatic dihydroxy monomer and a second aromatic dihydroxy monomer can be provided wherein the relative mole percentage ratio of the first monomer to the second monomer is 90 mole % to 10 mole %, 80 mole % to 20 mole %, 75 mole % to 25 mole %, 70 mole % to 30 mole %, 60 mole % to 40 mole %, or even 50 mole % to 50 mole %.

The polycarbonate resulting from the polycondensation reaction can optionally be compounded with one or more additives as described above. Exemplary additives include stabilizers, antioxidants, colorants, impact modifiers, flame retardants, anti drip additives, mold release additives, lubricants, plasticizers, minerals, reinforcement additives, or any combination thereof. According to some embodiments, the aforementioned additives comprise a phosphorous-containing compound, such as a phosphite or a phosphate. To that end, the amount of phosphorous-containing compound compounded with the polycarbonate is an amount sufficient to result in the desired effect for which the additive is intended. For example, if the additive is a flame retardant the amount of additive will be that amount sufficient to provide a desired level of flame retardance. Such amounts can be readily determined by one of ordinary skill in the art without undue experimentation. In some embodiments where the phosphorous-containing compound is a phosphite, phosphonate or combination thereof, it is present in an amount in the range of 0.0001 to 2.0 wt %. based on the parts by weight of the polycarbonate.

As used in the specification and claims herein, the term "compounding" refers to the intimate mixing of the polycarbonate and non-polycarbonate additives such as the phosphorous containing compound prior to preparation of a final product or article. Compounding is commonly performed by combining as-synthesized polycarbonate with the additive(s) and passing the mixture through an extruder to produce compounded pellets that can be dried and then further processed, for example into shaped articles. When dried, the pellets preferably have a moisture content less than about 100 ppm. The additive(s) can be combined with the as-synthesized polycarbonate prior to any pelletizing, or after pelletization of the as-synthesized polycarbonate.

Compounding can be performed either in a melt or in solution. In the melt, the polycarbonate and additives can be melt mixed or kneaded together in an extruder, melt kneader, reactor or other system or device capable of melting and mixing the polycarbonate and the additives, followed by extrusion or pelletization, or by direct melt processing into shaped articles. In solution processing, the polycarbonate and additive(s) are combined in an inert solvent and maintained together for sufficient reaction time and temperature to reduce the color of the composition. The solvent is then removed, for example using vacuum.

The temperature of the extruder in the foregoing methods will generally be the conventional extruder temperature used for forming pellets of a particular polycarbonate. The appropriate extruder temperature will depend on the properties of both the polycarbonate and the additives. Higher molecular weight polycarbonates and/or high heat polycarbonates containing monomer units that increase the glass transition temperature of the polycarbonate will typically require higher extruder temperatures, so that the melt viscosity is low enough for sufficient mixing with the additives to occur. Suitable temperature ranges are typically in the range of from 275 to 375° C., including for example the range of from 300 to 340° C. One skilled in the art will understand that the temperature of the polymer melt can vary somewhat from the extruder temperature depending on the occurrence of exothermic and/or endothermic reactions and processes and any heat generated by the mechanical mixing of the molten polymer.

The polycarbonate compositions of the invention can further be blended with additional carbonate or non carbonate polymers. For example, and without limitation, the polycarbonates of the invention can be blended with polyester (for example polybutylene terephthalates, polyethylene terephthalates, poly cyclohexane dimethanol terephthalates, polypropylene terephthalates, polylactic acid), polyarylates, styrene acrylonitriles (SAN), acrylonitrile butadiene styrenes (ABS), methyl methacrylates (PMMA), methacrylate butadiene styrenes (MBS), styrene maleic anhydrides (SMA), acrylic rubber, styrene butadiene styrenes (SBS), styrene ethylene butadiene styrenes (SEBS), polystyrenes (PS), polyolefins (for example polypropylene, polyethylene, high density polyethylene, linear low density polyethylene, low density polyethylene and polyolefin copolymers), polyetherimide (PEI), polyetherimide sulfone (PEIS) or any combination thereof.

Residual monomer content can be measured using standard techniques, such as gas or liquid chromatography, on an extract of the polymer. The extract can also be titrated to determine phenolic content. Chloride content can be determined for example by analysis of an aqueous extract of the polymer using for example ion chromatography (IC). Metals, including transition metals, and total chloride can be determined by pyrolysis/ashing of the sample followed by ion plasma chromatography (ICP) or other known techniques. Phenolic end groups of the polymer may be measured by known techniques such as titration, infrared spectroscopy (IR), and nuclear magnetic resonance (NMR). In one instance $^{31}P$ NMR analysis using phosphorous functionalization of end groups can be was used to characterize the resins. Wherein the PC resin was dissolved in $CDCl_3$ with pyridine and chromium acetylacetonate (CrAcAc) and the phenolic hydroxyl groups are phosphorylated with o-phenylene phosphorochloridite.

The polycarbonates of the present invention are well suited for a variety of uses, including various articles of manufacture. For example, and without limitation, the polycarbonate compositions of the invention can be used as either clear or opaque resins for medical uses, food service uses, housewares, electronics, packaging, computer enclosures, trays, drinking glasses, pitchers, eye glasses, syringes, connectors, cell phone housings, keycaps, handles, bottles, films, coatings, and the like.

Specific non-limiting examples of polycarbonate compositions of the invention are illustrated below. In one embodiment, a co-polycarbonate is disclosed wherein the repeating carbonate units are derived from a combination of resorcinol and di-tert butyl hydroquinone (DTBHQ) as aromatic dihydroxy co-monomers and phosgene as the selected carbonyl source reactant. Phenol can also be selected as the desired chain stopper. The resulting polycarbonate structure is shown below, wherein "n" can be any desired integer based upon the desired chain length for the co-polycarbonate.

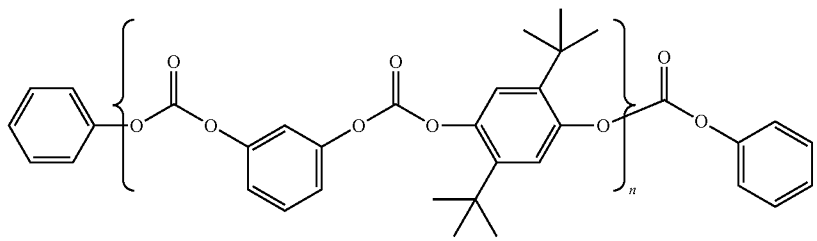

It is contemplated that this exemplified polycarbonate, and others disclosed herein, can be obtained having a Mw in the range of from 3,000 to 80,000 Daltons; a phenolic group content less than 20 meq/kg; a chloride content less than 20 ppm; a transition metal content less than 20 ppm; and a residual monomer content less than 100 ppm.

In another embodiment, a co-polycarbonate is disclosed wherein the repeating carbonate units are derived from a combination of resorcinol and spiro biindane bisphenol (SBIBP) as aromatic dihydroxy co-monomers and phosgene as the carbonyl source reactant. Phenol can again be selected as the desired chain stopper. The resulting polycarbonate structure is shown below, wherein "n" can again be any desired integer based upon the desired chain length for the co-polycarbonate.

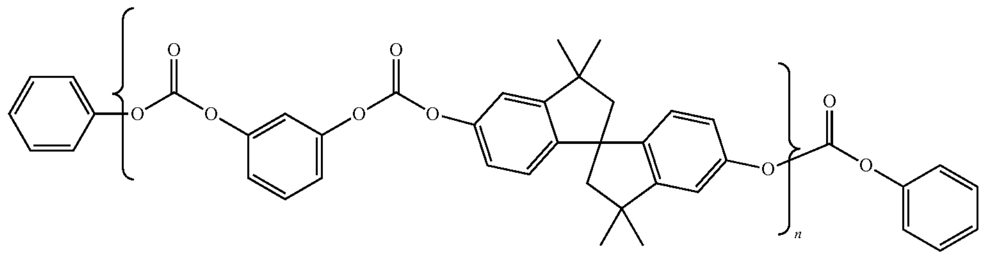

It is contemplated that this exemplified polycarbonate, and others disclosed herein, can be obtained having a Mw in the range of from 3,000 to 80,000 Daltons; a phenolic group content less than 20 meq/kg; a chloride content less than 20 ppm; a transition metal content less than 20 ppm; and a residual monomer content less than 100 ppm.

In another embodiment, a co-polycarbonate is disclosed wherein the repeating carbonate units are derived from a combination of resorcinol, spiro biindane bisphenol (SBIBP), and di-tert butyl hydroquinone (DTBHQ) as aromatic dihydroxy co-monomers and phosgene as the carbonyl source reactant. Phenol can again be selected as the desired chain stopper. The resulting polycarbonate structure is shown below, wherein "n" can again be any desired integer based upon the desired chain length for the co-polycarbonate.

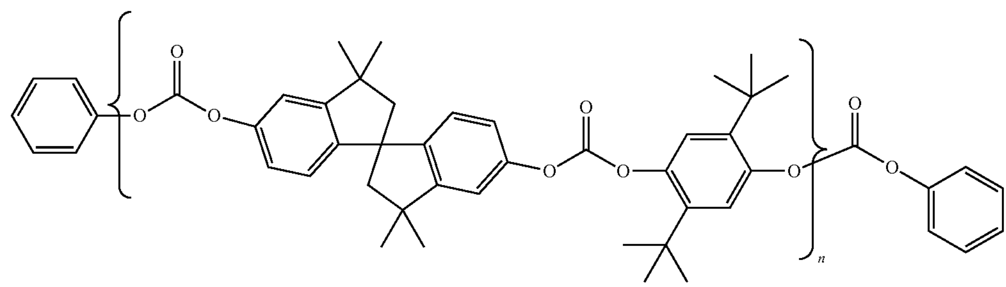

It is contemplated that this exemplified polycarbonate, and others disclosed herein, can be obtained having a Mw in the range of from 3,000 to 80,000 Daltons; a phenolic group content less than 20 meq/kg; a chloride content less than 20 ppm; a transition metal content less than 20 ppm; and a residual monomer content less than 100 ppm.

In another embodiment, a polyester carbonate copolymer is disclosed wherein the repeating carbonate units are derived from a combination of resorcinol and di-tert butyl hydroquinone (DTBHQ) as aromatic dihydroxy co-monomers, iso and terephthalic diacid chloride monomers, and phosgene as the carbonyl source reactant. Phenol can again be selected as the desired chain stopper. The resulting polycarbonate structure is shown below, wherein "n" can again be any desired integer based upon the desired chain length for the co-polycarbonate.

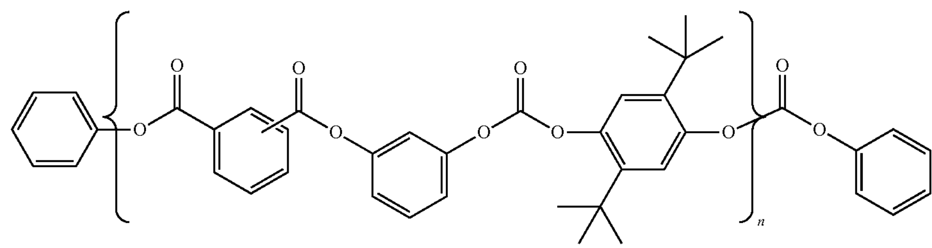

It is contemplated that this exemplified polycarbonate, and others disclosed herein, can be obtained having a Mw in the range of from 3,000 to 80,000 Daltons; a phenolic group content less than 20 meq/kg; a chloride content less than 20 ppm; a transition metal content less than 20 ppm; and a residual monomer content less than 100 ppm.

In still another embodiment, a polyester carbonate copolymer is disclosed wherein the repeating carbonate units are derived from a combination of resorcinol and spiro biindane bisphenol (SBIBP) as aromatic dihydroxy co-monomers, iso and terephthalic diacid chloride monomers, and phosgene as the carbonyl source reactant. Phenol can again be selected as the desired chain stopper. The resulting polycarbonate structure is shown below, wherein "n" can again be any desired integer based upon the desired chain length for the co-polycarbonate.

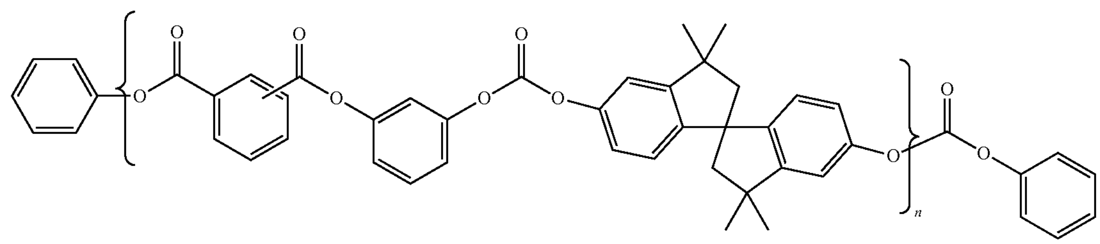

It is contemplated that this exemplified polycarbonate, and others disclosed herein, can be obtained having a Mw in the range of from 3,000 to 80,000 Daltons; a phenolic group content less than 20 meq/kg; a chloride content less than 20 ppm; a transition metal content less than 20 ppm; and a residual monomer content less than 100 ppm.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but normal experimental deviations should be accounted for. Unless indicated otherwise, parts are parts by weight, temperature is in C or is at ambient temperature, and pressure is at or near atmospheric. Examples of the invention are designated by numbers, control experiments are designated by letters.

Utilizing a conventional in vitro competitive binding assay as described above, estradiol binding activity was quantified by the half maximal inhibitory concentration ($IC_{50}$) value, which was evaluated for various phenolic compounds capable for use as component starting materials in the manufacture of polycarbonate compositions. These component starting materials mimic or replicate various chemical species that could be produced under some conditions, for example high (pH=8 to 12) or low (pH=1 to 6) pH, as hydrolysis degradation products derived from polycarbonates comprising the component starting materials. Specifically, ($IC_{50}$) binding concentrations for the alpha or beta in vitro estradiol receptors for various compounds were tested. Four separate sets of tests were run using a standard competitive binding assay. Samples were dissolved in either ethanol or DMSO. The various phenolic compounds were then tested at up to seven different concentrations for each test phenolic compound. Each of those tests was run in triplicate. Tests were conducted by displacement of a radio-ligand. For each set of tests a 17b-estradiol control sample was run to ensure proper binding of the natural hormone under the test conditions.

The polycarbonate hydrolysis or thermolysis product to be tested (Tables 1 to 4) was investigated as to its binding affinity for recombinant human estradiol receptors (rhER) alpha ($\alpha$) and beta 1 ($\beta$1) in vitro. 17$\beta$-Estradiol ($E_2$) was used a standard whose relative binding affinity was defined as 100%. Competitive binding assays were performed by incubating rhER alpha ($\alpha$) and beta 1 ($\beta$1) with 10 nM [$^3$H]estradiol (the radio ligand) in the presence or absence of increasing concentrations, 0.25 to 250,000 nM, of the phenolic test compounds of Tables 1 to 4 (nM is nano molar). Each data point is the average of at least two assays. Stock solutions of the compounds of Tables 1 to 4 were prepared at 10×E-2M in 100% ethanol, water or DMSO (dimethyl sulfoxide). Compounds were diluted 10 fold in binding buffer and then 1:4 in the final assay mix. The final concentration of ethanol or DMSO in the assay well was 5%. The highest concentration of the hydrolysis test compound was 2.5×E−4 M (250,000 nM). The potential hydrolysis or thermolysis compounds of Tables 1 to 4 were tested at seven concentrations over log increments. The lowest concentration was 2.5×E−10 M (0.25 nM). The IC50 is the concentration of test substance at which about 50% of the radio labeled estradiol was displaced from the estradiol receptor.

In some very surprising instances (see Tables 1 to 4) the disparate phenolic compounds: tetra methyl bisphenol-A (TMBPA), phenol, N-phenyl phenolphthalein bisphenol (PPPBP), resorcinol, p-hydroxy benzoic acid (PHBA), biphenol (BP), spiro biindane bisphenol (SBIBP), di t-butyl hydroquinone (DTBHQ) and methyl hydroquinone show no estradiol binding, even at the highest concentration. In terms of their ability to bind to alpha or beta estradiol hormone receptors these phenolic compounds show a surprising reduction in activity. In some instances no binding can be measured using standard biochemical analysis techniques to test estradiol binding activity. That is even at a concentration of 2.5×E−4 M there was no displacement of estradiol. Note that estradiol binds at very low concentrations of 1.0 to 14.7×E−9 M in our various control experiments and is much more active than any of the compounds tested.

The ($IC_{50}$) values obtained from these experiments are provided in the Tables below. As shown, many mono and bisphenols show an undesired high level of receptor binding. However very surprisingly the preferred phenolic compounds utilized to prepare the polycarbonate compositions of the invention (tetra methyl bisphenol-A (TMBPA), phenol, N-phenyl phenolphthalein bisphenol (PPPBP), resorcinol, p-hydroxy benzoic acid (PHBA), biphenol (BP), spiro biindane bisphenol (SBIBP), di t-butyl hydroquinone (DTBHQ) and methyl hydroquinone) either did not show any detectable estradiol binding in these tests or, at a minimum, did not exhibit an ($IC_{50}$) binding concentrations less than 2.5×E−4 M. An entry of >2.5×E−4 for compounds in Tables 1 to 4 indicates that those compounds did not compete to the extent of 50% with radio labeled 17B-estradiol at the highest concentration (250,000 nM) tested. That is there was no estradiol displacement and hence no IC50 could be determined, the IC50, if there is displacement at all, is some value greater than 2.5×E−4.

The estradiol displacement experiments of set 1 (Table 1) show that the phenolic compounds; p-cumyl phenol (control example B), dihydroxy diphenyl ether (control example C), bisphenol acetophenone (control example D), dimethyl acetophenone bisphenol (control example E) and diphenolic acid methyl ester (control example F) all displace estradiol (control example C) at surprisingly low concentrations. However Example 1, p-hydroxy benzoic acid, shows no displacement at either the alpha or beta estradiol receptors at as high as 2.5×E−4 molar concentration.

TABLE 1

| Experimental Set 1 | | | |
|---|---|---|---|
| Example | Compounds | IC50 rhER alpha | IC50 rhER beta |
| A | 17b-estradiol control | 1.0 × E−9 | 8.2 × E−9 |
| B | p-Cumyl Phenol (CAS# 599-64-4) | 1.4 × E−4 | 9.8 × E−6 |
| C | Dihydroxy Diphenyl Ether (CAS# 1965-09-9) | 6.0 × E−5 | 1.4 × E−5 |
| D | Bisphenol Acetophenone (CAS# 1571-75-1) | 1.2 × E−5 | 1.4 × E−6 |
| E | Dimethyl Acetophenone Bisphenol (CAS# 4754-63-6) | 4.8 × E−6 | 3.5 × E−6 |
| F | Diphenolic Acid Methyl Ester (CAS# 7297-85-0) | 1.9 × E−5 | 1.1 × E−5 |
| 1 | p-Hydroxy Benzoic Acid CAS# 99-96-7) | >2.5 × E−3 | >2.5 × E−3 |
| | IC50 is the conc. of the candidate that displaces 50% of the radioactive ligand from the rhER cells | >2.5 × E4 compounds did not compete to the extent of 50% with radiolabeled 17B-estradiol at the highest conc. (250,000 nM) tested, no IC50 can be determined | |

In second set of experiments (Table 2) phenolic compounds structurally similar to, but not identical to those of set 1, were tested as to their ability to displace estradiol. Surprisingly tetra methyl BPA (Example 2), phenol (Example 3), N-phenolphthalein bisphenol (Example 4) and resorcinol (Example 5) show no detectible estradiol displacement at either the alpha or beta estradiol receptor at as high as 2.5×E−4 molar concentration. On the other hand dimethyl cyclohexyl bisphenol (control example H) and the closely structurally related compounds of control examples B to F (Table 1) all show displacement of estradiol at both the alpha or beta receptors at lower concentration. The estradiol binding of phenolic compounds seems to be very unpredictable. It does not correlate with molecular weight, phenolic group separation, molecular rigidity, solubility, steric hindrance or electronic effects. Note that while the phenolic compounds of our invention show no displacement at the alpha or beta estradiol binding sites at concentration below the 2.5×E−4 limit of detection, even the control examples, while showing some binding, are not as reactive as estradiol (control examples A and G). 17b-Estradiol binds at a very low concentration.

TABLE 2

| Experimental Set 2 | | | |
|---|---|---|---|
| Example | Compounds | IC50 rhER alpha | IC50 rhER beta |
| G | 17b-estradiol control | 10.0 × E−9 | 6.4 × E−9 |
| H | Dimethyl Cyclohexyl Bisphenol (CAS# 2362-14-3) | 1.3 × E−6 | 3.1 × E−6 |
| 2 | Tetra Methyl BPA (CAS# 5613-46-7) | >2.5 × E−4 | >2.5 × E−4 |
| 3 | Phenol (CAS# 108-95-2) | >2.5 × E−4 | >2.5 × E−4 |
| 4 | N-Phenyl Phenolphthalein Bisphenol (CAS# 6607-41-6) | >2.5 × E−4 | >2.5 × E−4 |

TABLE 2-continued

| Experimental Set 2 | | | |
|---|---|---|---|
| Example | Compounds | IC50 rhER alpha | IC50 rhER beta |
| 5 | Resorcinol (CAS# 108-46-3) | >2.5 × E−4 | >2.5 × E−4 |
| | IC50 is the conc. of the candidate that displaces 50% of the radioactive ligand from the rhER cells | >2.5 × E4 compounds did not compete to the extent of 50% with radiolabeled 17B-estradiol at the highest conc. (250,000 nM) tested, no IC50 can be determined | |

In a further set of experiments (Table 3) the surprising and unpredictable trend of estradiol displacement is again observed. The bis phenolic compounds: fluorenone bis o-cresol (control example J), hydro isophorone bisphenol (control example K), bisphenol M (control example L), and bis hydroxy phenyl menthane (control example M) all displace estradiol at low concentrations. On the other hand, spiro biindane bisphenol (Example 6), biphenol (Example 7) and di-2,5-tert-butyl hydroquinone (Example 8) all show no displacement of the estradiol at the alpha receptor at 2.5×E−4 M concentration. Examples 6 and 8 also show no displacement at the beta receptor.

TABLE 3

| Experimental Set 3 | | | |
|---|---|---|---|
| Example | Compounds | IC50 rhER alpha | IC50 rhER beta |
| I | 17b-estradiol control | 7.0 × E−9 | 6.6 × E−9 |
| J | Fluorenone Bis o-Cresol (CAS# 88938-12-9) | 9.7 × E−6 | 2.5 × E−5 |
| K | Hydro Isophorone Bisphenol (CAS# 129188-99-4) | 4.5 × E−7 | 1.1 × E−6 |
| L | Bisphenol M (CAS# 13595-25-0) | 2.1 × E−6 | 1.4 × E−6 |
| M | Bis Hydroxy Phenyl Menthane (CAS# 58555-74-1) | 4.9 × E−7 | 6.7 × E−7 |
| 6 | Spiro Biindane Bisphenol (CAS# 1568-80-5) | >2.5 × E−4 | >2.5 × E−4 |
| 7 | Biphenol (CAS# 92-88-6) | >2.5 × E−4 | 1.7 × E−6 |
| 8 | Di t-Butyl Hydroquinone (CAS# 88-58-4) | >2.5 × E−4 | >2.5 × E−4 |
| | IC50 is the conc. of the candidate that displaces 50% of the radioactive ligand from the rhER cells | >2.5 × E4 compounds did not compete to the extent of 50% with radiolabeled 17B-estradiol at the highest conc. (250,000 nM) tested, no IC50 can be determined | |

In yet another set of experiments (Table 4) undesirable estradiol displacement at low concentration is observed for the bisphenols benzophenone bisphenol (control example O) and phenolphthalein (control example P) while methyl hydroquinone (Example 9) surprisingly shows no alpha or beta estradiol displacement at as high as 2.5×E−4 molar concentration. As in the other sets of experiments (Tables 1 to 3) an estradiol control (example N) was run as part of the set to establish a baseline of estradiol displacement. Estradiol displaces at much lower concentration than any of the phenolic compounds.

TABLE 4

| Experimental Set 4 | | | |
|---|---|---|---|
| Example | Compounds | IC50 rhER alpha | IC50 rhER beta |
| N | 17b-estradiol control | 10.0 × E−9 | 14.7 × E−9 |
| O | Benzophenone bisphenol (CAS# 611-99-4) | 3.1 × E−5 | 3.2 × E−6 |
| P | Phenolphthalein (CAS# 77-09-8) | 3.7 × E−6 | 1.4 × E−5 |
| 9 | Methyl Hydroquinone (CAS# 95-71-6) | >2.5 × E−4 | >2.5 × E−4 |
| | IC50 is the conc. of the candidate that displaces 50% of the radioactive ligand from the rhER cells | >2.5 × E4 compounds did not compete to the extent of 50% with radiolabeled 17B-estradiol at the highest conc. (250,000 nM) tested, no IC50 can be determined | |

Example

Synthesis and Properties

A polyester carbonate (Example 10) comprising, resorcinol, N-phenyl phenolphthalein bisphenol end capped with phenol, monomers that have an estradiol IC 50 binding of >2.5×E4, was prepared in the following manner. Methylene chloride (15 L), aqueous resorcinol solution [2021 g resorcinol dissolved in 1654 ml deionized (DI) water], phenol (55 g, 0.58 mol), and triethylamine (60 ml) were charged to a 75 L reactor equipped with mechanical stirring, recirculation line with pH probe, subsurface phosgene addition, chilled glycol condenser, caustic scrubber for exit gas, and caustic solution inlet. A molten 50/50 mixture of terephthaloyl chloride and isophthaloyl chloride (2240 g, 11.0 moles) was fed to the reactor at 108 g/min while a 33 wt % aqueous NaOH solution (3591 g) was added at a sufficient rate to maintain pH=4 to 5. Additional caustic was then added to adjust the pH to 7 to 8 and the reaction was stirred for ~5 minutes. Additional methylene chloride (8 L), DI water (11 L) and 3,3-bis(4-hydroxyphenyl)-2-phenylisoindolin-1-one (405 g, 1.03 mol) was added. Phosgene (540 g, 5.45 moles) was then charged at 80 g/min while 33 wt % aqueous caustic was added as needed to maintain pH=8 to 9 in the reactor. A sample was taken from the reactor and analyzed by GPC (CH2Cl2, calibrated against BPA PC standards) which showed weight average molecular weight Mw=26996. The batch was held at pH=8 to 9 during the 20 minutes needed to run the GPC. Additional phosgene (200 g, 2.02 mole) was then added while 33 wt % aqueous caustic was added as needed to maintain pH=8 to 9 in reactor. The batch was then purged with nitrogen and transferred to a centrifuge feed tank where the concentrated HCl was added to reduce to pH<7. The batch was purified on a centrifuge train where the brine phase was separated and the resin solution in methylene chloride was extracted with aqueous HCl and then washed with deionized water until titratable chlorides were less than 5 ppm. The methylene chloride solution was then steam precipitated and the polymer dried under hot nitrogen until volatile levels were <0.4 wt %. One gram of the dry polymer powder was extracted with ~10 ml. acetonitrile (CH3CN) and analyzed by liquid chromatography. The polymer had 71 ppm residual N-phenyl phenolphthalein bisphenol monomer and 16 ppm residual resorcinol monomer.

The properties of the resorcinol N-phenyl phenolphthalein bisphenol polyester carbonate (Example 10) are shown in Table 5. The corresponding resorcinol bisphenol A (BPA) based polyester carbonate, comparative example Q, was prepared as described above using bisphenol A (BPA) in place of N-phenyl phenolphthalein bisphenol and p-cumyl phenol (PCP) in place of the phenol end cap. Comparative example Q had residual monomer content by acetonitrile extraction of 39 ppm BPA, 18 ppm PCP and 20 ppm resorcinol. The resins were pelletized on a 30 mm vacuum vented twin screw extruder at 300 rpm. The extruder was set at 275 to 300° C. The clear extrudates were cooled, pelletized, and dried at 120° C. Test samples were injection molded at a set temperature of 270 to 290° C. using a 30 sec. cycle time.

Property Testing Procedures

Properties were measured in accordance with ASTM test methods. All molded samples were conditioned for at least 48 h at 50% relative humidity prior to testing. Percent transmittance (% T) and percent haze (% H) were measured per ASTM method D1003 at 3.2 mm. Tensile properties were measured on 3.2 mm type I bars in accordance with ASTM method D638 with a crosshead speed of 5 mm/min. Tensile modulus was measured as tangent, tensile strength measured at yield and percent elongation measured at break. Heat distortion temperature (HDT) was measured at 1.82 MPa (264 psi) on 3.2 mm thick bars in accordance with ASTM D648. Notched Izod was measured in accordance with ASTM D256 using a 5 lb hammer respectively on 3.2 mm thick samples. Multiaxial impact (MAI) was run using a falling weight as per ASTM D3763 at a speed of 3.4 m/sec. on 3.2 mm thick discs. Total energy is reported in Joules (J). Glass transition temperature (Tg) was determined by differential scanning calorimetry (DSC) with a 20° C./min. heating rate in accordance with ASTM D7426. Thermal Gravimetric Analyses (TGA) was done under nitrogen from 23 to 800° C. at a rate of 20° C./min. Melt flow (MVR) was run on dried pellets as per ASTM D1238 at 300° C. using a 1.2 Kg weight with a 6 and 18 minute equilibration time. MVR was measured as cc/10 minutes. Viscosity vs. time, also known as melt dwell (MV Dwell) or time sweep, was run using a parallel plate fixture rheometer at 300° C. for 30 minutes at 10 radians/sec. under nitrogen as per ASTM D4440. Viscosity in poise (P) was compared the start and end of the test. A small change (less than 10%) between the initial and final values indicates good melt stability.

As shown in Table 5 the resin of Example 10 shows good ductility with a MAI of over 70 J with ductile failure. The Tg (150° C.) is increased by 10° C. over the BPA derived control (Comparative Example Q). HDT of the N-phenyl phenolphthalein bisphenol polyester carbonate (Example 10) is 127° C. over 10° C. higher than the BPA version (Comparative Example Q). The resin showed good melt stability with little change in MVR after 6 and 18 minutes and less than a 10% change in the MV dwell test. The TGA analysis also shows good resistance to heat with the 5% wt. loss above 450° C. The tensile modulus was above 2500 MPa and % elongation at break was above 50%. The resin of Example 10 was transparent with a % T at 3.2 mm above 60%.

TABLE 5

| Example | Q | 10 | Notes |
|---|---|---|---|
| Residual BPA ppm | 39 | 0 | CH3CN extract |
| Residual p-cumyl phenol (PCP) ppm | 18 | 0 | |
| Residual resorcinol ppm | 20 | 16 | |
| Residual N-phenyl phenolphthalein bisphenol | 0 | 71 | |
| MVR 6 min. 300 C. cc/10 min | 10.5 | 1.9 | 1.26 Kg wt |
| MVR 18 min. 300 C. cc/10 min | 11.0 | 1.9 | |
| MV dwell at 300 C. start (Poise) | 5327 | 31041 | |

TABLE 5-continued

| Example | Q | 10 | Notes |
|---|---|---|---|
| MV dwell 30 min @ 300 C. (Poise) | 5101 | 31996 | |
| % change in viscosity after 30 min. | −4.2% | 3.1% | |
| Tg DSC C. | 140 | 151 | 20 C./min. |
| HDT 264 psi C. | 116 | 127 | 3 C./ min. |
| TGA nitrogen % char | 37.7 | 42.7 | 20 C./min. |
| % wt loss | 62.3 | 57.3 | |
| Temp, peak wt loss C. | 523 | 524 | |
| Temp. 1% wt loss C. | 441 | 461 | |
| Temp. 5% wt loss C. | 481 | 492 | |
| N Izod J/m | 83 | 102 | 5 lb hammer |
| MAI total energy J | 80 | 75 | 3.4 m/sec. |
| % Transmission | 84 | 68 | 3.2 mm |
| % Haze | 3 | 2 | |
| T Mod. MPa (as tangent) | 2480 | 2600 | 5 mm/min |
| T Str. @ yield (Y) MPa | 70.5 | 78.3 | |
| % Elong. @ break | 106 | 89 | |

What is claimed is:

1. A polycarbonate, comprising:

repeating carbonate units derived from one or more phenolic monomer, wherein each of the one or more phenolic monomers does not exhibit a half maximal inhibitory concentration ($IC_{50}$) less than 0.00025M for alpha or beta in vitro estradiol receptors, and wherein when the polycarbonate is subjected to conditions effective to provide one or more hydrolysis product, each of the one or more hydrolysis products does not exhibit a half maximal inhibitory concentration ($IC_{50}$) less than 0.00025M for alpha or beta in vitro estradiol receptors; and wherein the polycarbonate further comprises:

a) a molecular weight in the range of from 3,000 to 80,000 Daltons;

b) a phenolic end group content less than 20 meq/kg;

c) a total chloride content less than 20 ppm;

d) a transition metal content less than 20 ppm; and e) a residual phenolic monomer content less than 100 ppm.

2. The polycarbonate of claim 1, wherein the one or more phenolic monomers comprises a bisphenolic monomer, a mono phenolic monomer, or a combination thereof.

3. The polycarbonate of claim 1, wherein the one or more phenolic monomer comprises resorcinol, hydroquinone, methyl hydroquinone, t-butyl hydroquinone, di-t-butyl hydroquinones, biphenols, tetramethyl bisphenol-A, spiro biindane bisphenols, bis-(hydroxy aryl)-N-aryl isoindolinones, or any combination thereof.

4. The polycarbonate of claim 1, wherein the polycarbonate is a poly (ester carbonate) further comprising repeating ester units derived from one or more dicarboxylic acid monomers, one or more phenolic carboxylic acid monomers, or a combination thereof, and wherein each of the one or more dicarboxylic acid monomers, phenolic carboxylic acid monomers, or combinations thereof, does not exhibit a half maximal inhibitory concentration ($IC_{50}$) less than 0.00025M for alpha or beta in vitro estradiol receptors.

5. The polycarbonate of claim 4, wherein the one or more dicarboxylic acid, or phenolic carboxylic acid monomer comprises isophthalic acid, terephthalic acid, a $C_6$ to $C_{36}$ aliphatic dicarboxylic acids, hydroxy benzoic acids, or any combination thereof.

6. The polycarbonate of claim 1, wherein the polycarbonate is end capped with phenol or phenyl chloroformate.

7. The polycarbonate of claim 4, wherein the poly(ester carbonate) is end capped with phenol or phenyl chloroformate.

8. The polycarbonate of claim 1, wherein the polycarbonate is a co-polycarbonate comprising repeating carbonate units derived from two or more phenolic monomers.

9. The polycarbonate of claim 1, further comprising one or more additives and wherein each of the one or more additives does not exhibit a half maximal inhibitory concentration ($IC_{50}$) less than 0.00025M for alpha or beta in vitro estradiol receptors.

10. The polycarbonate of claim 9, wherein the one or more additives comprises a stabilizer, antioxidant, colorant, impact modifier, flame retardant, anti drip additive, mold release additive, lubricant, plasticizer, mineral, reinforcement additive, or any combination thereof.

11. The polycarbonate of claim 10, wherein the one or more additive comprises a phosphite and wherein when the phosphite is subjected to conditions effective to provide one or more phosphite hydrolysis products, each of the one or more phosphite hydrolysis products does not exhibit a half maximal inhibitory concentration ($IC_{50}$) less than 0.00025M for alpha or beta in vitro estradiol receptors.

12. The polycarbonate of claim 11, wherein the phosphite comprises a diphenyl alkyl phosphite, phenyl dialkyl phosphite, trialkyl phosphite, dialkyl phosphite, triphenyl phosphite, diphenyl pentaerythritol diphosphite, or any combination thereof.

13. The polycarbonate of claim 11, wherein the phosphite has a molecular weight greater than 200 Daltons.

14. The polycarbonate of claim 9, further comprising a phosphorus compound and wherein when the polycarbonate is subjected to conditions effective to provide one or more phosphorous compound hydrolysis products, each of the one or more phosphorous compound hydrolysis products does not exhibit a half maximal inhibitory concentration ($IC_{50}$) less than 0.00025M for alpha or beta in vitro estradiol receptors.

15. The polycarbonate of claim 14, wherein the phosphorus compound comprises an aryl phosphate comprising triphenyl phosphate, resorcinol phenyl diphosphate, spirobiindane phenyl diphosphate, di-tertbutyl hydroquinone phenyl diphosphate, biphenol phenyl diphosphate, hydroquinone phenyl diphosphate, or any combination thereof.

16. A polymer blend comprising:

a) a first polymer component comprising at least one polycarbonate according to claim 1; and b) a second polymer component comprising a non-polycarbonate polymer.

17. The polymer blend of claim 16, wherein the second polymer component comprises one or more polyesters, styrene acrylonitriles, acrylonitrile butadiene styrenes, methyl methacrylates, methacrylate butadiene styrenes, styrene maleic anhydrides, styrene butadiene styrenes, styrene ethylene butadiene styrenes, polystyrenes, polyolefins, polyetherimides, or any combination thereof.

18. An article of manufacture comprising a polycarbonate according to claim 1.

19. A method for the manufacture of a polycarbonate, comprising:

a) providing a one or more phenolic monomers that does not exhibit a half maximal inhibitory concentration ($IC_{50}$) less than 0.00025M for alpha or beta in vitro estradiol receptors;

b) providing a carbonyl source reactant; and c) reacting the one or more phenolic monomers and carbonyl source reactant under conditions effective to provide a polycondensation reaction product comprising a polycarbonate wherein when the polycarbonate is subjected to conditions effective to provide one or more hydrolysis products, each of the one or more hydrolysis products does not exhibit a half maximal inhibitory concentration ($IC_{50}$) less than 0.00025M for alpha or beta in vitro estradiol receptors; and wherein the polycarbonate further comprises:

a) a molecular weight in the range of from 3,000 to 80,000 Daltons;

b) a phenolic end group content less than 20 meq/kg;

c) a total chloride content less than 20 ppm;

d) a transition metal content less than 20 ppm; and e) a residual phenolic monomer content less than 100 ppm.

20. The method of claim 19, wherein the one or more phenolic monomers comprises a bisphenolic monomer, a mono phenolic monomer, or a combination thereof.

21. The method of claim 19, wherein the one or more phenolic monomer comprises resorcinol, hydroquinone, methyl hydroquinone, t-butyl hydroquinone, di-t-butyl hydroquinones, biphenols, tetramethyl bisphenol-A, spiro biindane bisphenols, bis-(hydroxy aryl)-N-aryl isoindolinones, or any combination thereof.

22. The method of claim 19, further comprising providing one or more dicarboxylic acid monomers or phenolic carboxylic acid monomers wherein each of the one or more dicarboxylic acid monomers or phenolic carboxylic acid monomers does not exhibit a half maximal inhibitory concentration ($IC_{50}$) less than 0.00025M for alpha or beta in vitro estradiol receptors; and wherein reacting the one or more dicarboxylic acid monomers or phenolic carboxylic acid monomers, the one or more phenolic monomers, and the carbonyl source reactant under conditions effective to provide a polycondensation reaction product comprising a poly(ester carbonate).

23. The method of claim 22, wherein the one or more dicarboxylic acid monomers or phenolic carboxylic acid monomers comprise isophthalic acid, terephthalic acid, a $C_6$ to $C_{36}$ aliphatic dicarboxylic acids, the phenolic carboxylic acid comprises a hydroxy benzoic acid or any combination thereof.

24. The method of claim 19, wherein the carbonyl source reactant comprises a carbonyl halide or a diaryl carbonate.

25. The method of claim 24, wherein the diaryl carbonate is diphenyl carbonate.

26. The method of claim 19, wherein the conditions effective to provide a polycondensation reaction product comprise reacting the one or more phenolic monomers and the carbonyl source reactant in the presence of a polycondensation catalyst.

27. The method of claim 19, wherein the conditions effective to provide a polycondensation reaction product comprise reacting the one or more phenolic monomers and the carbonyl source reactant in the presence of an end capping agent.

28. The method of claim 27, wherein the end capping agent comprises phenol or phenyl chloroformate.

29. The method of claim 19, wherein the polycarbonate is blended with one or more additives and wherein each of the one or more additives does not exhibit a half maximal inhibitory concentration ($IC_{50}$) less than 0.00025M for alpha or beta in vitro estradiol receptors.

30. The method of claim 29, wherein the one or more additives comprises a stabilizer, antioxidant, colorant, impact modifier, flame retardant, anti drip additive, mold release additive, lubricant, plasticizer, mineral, reinforcement additive, or any combination thereof.

31. The method of claim 29, wherein the one or more additives comprises a phosphite and wherein when the phosphite is subjected to conditions effective to provide one or more phosphite hydrolysis products, each of the one or more phosphite hydrolysis products does not exhibit a half maximal inhibitory concentration ($IC_{50}$) less than 0.00025M for alpha or beta in vitro estradiol receptors.

32. The method of claim 31, wherein the phosphite comprises a diphenyl alkyl phosphite, phenyl dialkyl phosphite, trialkyl phosphite, dialkyl phosphite, triphenyl phosphite, diphenyl pentaerythritol diphosphite, or any combination thereof.

33. The method of claim 31, wherein the phosphite has a molecular weight greater than 200 Daltons.

34. The method of claim 29, wherein the one or more additives comprises a phosphorus compound and wherein when the phosphorous compound is subjected to conditions effective to provide one or more phosphorous compound hydrolysis products, each of the one or more phosphorous compound hydrolysis products does not exhibit a half maximal inhibitory concentration ($IC_{50}$) less than 0.00025M for alpha or beta in vitro estradiol receptors.

35. The method of claim 34, wherein the phosphorus compound comprises; triphenyl phosphate, resorcinol phenyl diphosphate, spirobiindane phenyl diphosphate, di-tertbutyl hydroquinone phenyl diphosphate, biphenol phenyl diphosphate, hydroquinone phenyl diphosphate, or any combination therefore.

36. The method of claim 19, wherein the polycarbonate polycondensation reaction product is melt processed to provide the polycarbonate in a pelletized form.

37. The method of claim 36, wherein the pelletized polycarbonate has a water content of less than 100 ppm.

* * * * *